(12) United States Patent
Cummings et al.

(10) Patent No.: US 12,192,069 B1
(45) Date of Patent: Jan. 7, 2025

(54) MULTI-LAYERED CHARGING SYSTEM

(71) Applicant: DISH Wireless L.L.C., Littleton, CO (US)

(72) Inventors: Michael Cummings, Littleton, CO (US); Alejandro Torres, Littleton, CO (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

(21) Appl. No.: 18/348,234

(22) Filed: Jul. 6, 2023

(51) Int. Cl.
  *H04L 41/5006* (2022.01)
  *H04L 41/50* (2022.01)
  *H04L 41/5009* (2022.01)

(52) U.S. Cl.
  CPC ...... *H04L 41/5006* (2013.01); *H04L 41/5012* (2013.01); *H04L 41/5029* (2013.01)

(58) Field of Classification Search
  CPC ............. H04L 41/5006; H04L 41/5012; H04L 41/5029; H04L 63/08; H04L 67/561; G06F 21/31; G06F 21/6218
  See application file for complete search history.

(56) References Cited

U.S. PATENT DOCUMENTS

| | | | |
|---|---|---|---|
| 8,175,575 B2* | 5/2012 | Cai ........................ | H04W 4/24 455/406 |
| 8,195,823 B2* | 6/2012 | Thornton ............ | H04L 67/1001 709/236 |
| 8,417,770 B2* | 4/2013 | Vange .................... | G06F 9/5055 709/224 |
| 9,948,646 B1* | 4/2018 | Lai ......................... | H04W 12/06 |
| 10,425,804 B2* | 9/2019 | Gallmann ............... | H04W 8/26 |
| 10,609,224 B2* | 3/2020 | Mandanapu .......... | H04M 15/60 |
| 11,216,539 B2* | 1/2022 | Chang .................... | H04L 67/562 |
| 11,564,000 B1* | 1/2023 | Fong .................. | H04N 21/4398 |
| 11,887,109 B1* | 1/2024 | Bryan ..................... | H04W 8/18 |

(Continued)

OTHER PUBLICATIONS

Fudzee et al., "QoS-based adaption service selection broker", Future Generation Systems, Sep. 2010, Elsevier Publishing.*

(Continued)

*Primary Examiner* — Todd L Barker
(74) *Attorney, Agent, or Firm* — Kilpatrick Townsend & Stockton LLP (57) ABSTRACT

A method may include receiving, by a computing system of a front-end service provider, a communications request including user data. The method may include determining, by the computing system of the front-end service provider, that one or more back-end service providers can fulfil the communications request. The method may include transmitting, by the computing system of the front-end service provider, data associated with the communications request and/or the one or more back-end service providers to a proxy service. The method may include receiving, by the computing system of the front-end service provider and from the proxy service, information associated with a back-end service provider of the one or more back-end service providers. The method may also include establishing, by the computing system of the front-end service provider, a communications connection with the back-end service provider and transmitting the user data such that the communications request is fulfilled.

19 Claims, 8 Drawing Sheets

(56) References Cited

U.S. PATENT DOCUMENTS

| | | | | |
|---|---|---|---|---|
| 2005/0177616 | A1* | 8/2005 | Addington | H04L 67/563 |
| | | | | 709/203 |
| 2009/0264096 | A1* | 10/2009 | Cai | H04W 4/24 |
| | | | | 455/406 |
| 2010/0011116 | A1* | 1/2010 | Thornton | H04L 63/1416 |
| | | | | 714/776 |
| 2011/0077058 | A1* | 3/2011 | Cai | H04W 4/24 |
| | | | | 455/573 |
| 2011/0302321 | A1* | 12/2011 | Vange | H04L 67/564 |
| | | | | 709/241 |
| 2012/0284777 | A1* | 11/2012 | Eugenio | H04W 4/50 |
| | | | | 726/4 |
| 2018/0007213 | A1* | 1/2018 | Mandanapu | H04M 15/66 |
| 2020/0051161 | A1* | 2/2020 | Dylla | G06F 21/6245 |
| 2020/0107166 | A1* | 4/2020 | Huang | H04M 15/61 |
| 2020/0125700 | A1* | 4/2020 | Chang | G06F 21/6218 |
| 2022/0137180 | A1* | 5/2022 | Lee | H01Q 25/00 |
| | | | | 342/55 |
| 2022/0247827 | A1* | 8/2022 | Das | G06F 11/1423 |
| 2022/0327597 | A1* | 10/2022 | Griesmer | G06Q 30/0631 |
| 2023/0396715 | A1* | 12/2023 | Ying | H04L 12/14 |

OTHER PUBLICATIONS

Jin et al., "Integrated Service Composition Approach Based on Transparent Access to Heterogeneous IoT Networks Using Multiple Service Providers", May 2021.*

IBM, "Charging Event Server: IPCOM000172799D", ip.com , Jul. 16, 2008.*

* cited by examiner

FIG. 7

MULTI-LAYERED CHARGING SYSTEM

BACKGROUND OF THE INVENTION

This disclosure generally relates to providing a communications service to a user equipment in a 5G network. More specifically, this disclosure relates to determining a back-end service provider and associated charging function.

BRIEF SUMMARY OF THE INVENTION

In an embodiment, a method may include receiving, by a computing system of a front-end service provider, a communications request including user data. The method may include determining, by the computing system of the front-end service provider, that one or more back-end service providers can fulfil the communications request. The method may also include transmitting, by the computing system of the front-end service provider, data associated with the communications request and/or the one or more back-end service providers to a proxy service. The method may then include receiving, by the computing system of the front-end service provider and from the proxy service, information associated with a back-end service provider of the one or more back-end service providers. The method may also include establishing, by the computing system of the front-end service provider, a communications connection with the back-end service provider. The method may then include transmitting, by the front-end service provider and to the back-end service provider, the user data such that the communications request is fulfilled.

In some embodiments, determining that one or more back-end service providers can fulfil the communications request further may include accessing, by the computing system of the front-end service provider, one or more policies associated with at least one of the communications request, a sender of the communications request, and policies associated with the front-end service provider. The determining may also include accessing, by the computing system of the front-end service provider, one or more provider attributes associated with the back-end service providers. In some embodiments, the one or more provider attributes may include a charging function, a service level, and/or a service capacity. The information associated with the back-end service provider may include a charging function. The computing system of the front-end service provider may determine the charging function associated with the back-end service provider based at least in part on a charging function registry. The proxy service may be a charging function proxy.

In some embodiments, the computing system of the front-end service provider provides authentication information associated with a user equipment (UE) of the communications request to the back-end service provider after the communications connection is established. The information associated with a back-end service provider may include information associated with an online marketplace. A charging function associated with the back-end service provider may also be associated with a charging-as-a-service entity. In some embodiments, the communications request is fulfilled by a plurality of back-end service providers.

In an embodiment, computing system (sometimes "system") of a front-end service provider may include one or more processors. The system may also include non-transitory computer-readable memory including instructions. When executed by the one or more processors, the instructions may cause the system to perform operations. According to the instructions, the system may receive a communications request including user data. The system may determine that one or more back-end service providers can fulfil the communications request. The system may transmit data associated with the communications request and the one or more back-end service providers to a proxy service. The system may then receive, via the proxy service, information associated with a back-end service provider of the one or more back-end service providers. The system may establish a communications connection with the back-end service provider. The system may then transmit, to the back-end service provider, the user data such that the communications request is fulfilled.

In some embodiments, the system may include a stand-alone 5g network. The system may include a session management function, a user plane function, a policy control function and a network repository function. The policy control function may include one or more policies associated with at least one of the communications request, a sender of the communications request, and policies associated with a front-end service provider. The network repository function may include one or more charging functions, associated with the one or more back-end service providers. The network repository function may also include a charging function associated with an online marketplace for back-end service providers.

In some embodiments, the session management function may include one or more provider attributes. The one or more provider attributes may include a service level and a service capacity. The communications request may be received from a user equipment (UE). The system of the front-end service provider may provide authentication information associated with the UE to the back-end service provider after the communications connection is established. The information associated with the back-end service provider may include a charging function.

DETAILED DESCRIPTION OF THE INVENTION 5G networks may be capable of providing several services to a user via a user equipment (UE). With the service-based nature of 5G networks, some of the services or portions thereof may be provided by one or more service providers. A front-end service provider may be a provider that is user-facing; the user interacts directly with the front-end service provider in most or all of the UE's interactions with the 5G network. A back-end service provider may be a provider that completes some or all of a service (e.g., gaming services, video services, voice services, location services, sensor reporting services, data services, etc.), with or without the UE's (or the user's) knowledge. In other words, some services may be provided to the UE by the front-end service provider in conjunction with the back-end service provider, while the UE (and user) may only be aware of the front-end service provider.

In some embodiments, the front-end service provider and backend-service provider may be the same entity. For example, a voice service between two UE's on the same network hosted by the front-end service provider. In that case, the voice service may be provided solely by the front-end service provider. Doing so may provide a more stable communications channel, faster service, more efficient use of computing power, cost-savings, or other benefits. In other cases, however, there may be benefits for providing the service using an alternate back-end service provider.

For example, a video service may be requested by the UE, where a connection is required in a region not serviced by the front-end service provider. While the front-end service provider may be able to provide the communications channel for the video service anyway, it may require less bandwidth to provide the video service using an alternate service provider instead. Then, the front-end service provider may utilize the alternate service provider as a back-end service provider and provide the video service to the UE.

With the number of 5G network providers already large (and growing), identifying a back-end service provider may pose several issues. One issue may be awareness of all available back-end service providers for a given service. The front-end service provider may only be aware of some portion of the available 5G network providers. Thus, the front-end service provider may only have policies, credentials, etc. for the portion of the available 5G network providers and not be aware of one or more benefits available (e.g., greater speed, bandwidth availability, etc.) with other 5G network providers.

Another issue in implementing such as system may lie in the charging functions (CHFs) associated with each of the back-end services providers. A CHF may permit services registered within the 5G network of the front-end service provider to calculate and charge a user and/or service provider accordingly. If a service provider is not registered within the 5G network, the front-end service provider may not be able to determine how to properly charge (or credit) the UE and/or the back-end service provider. Without the required CHFs, the front-end service provider may unnecessarily provide slower service, use more bandwidth than needed, and/or fail to deliver a requested service. Therefore, providing services to a UE via a front-end service provider and one or more back-end service providers, including discovering and applying appropriate CHFs may provide significant service improvements to both the front-end service provider and UE/user. The systems and methods used herein may provide one or more ways of addressing these issues.

Figure 1:
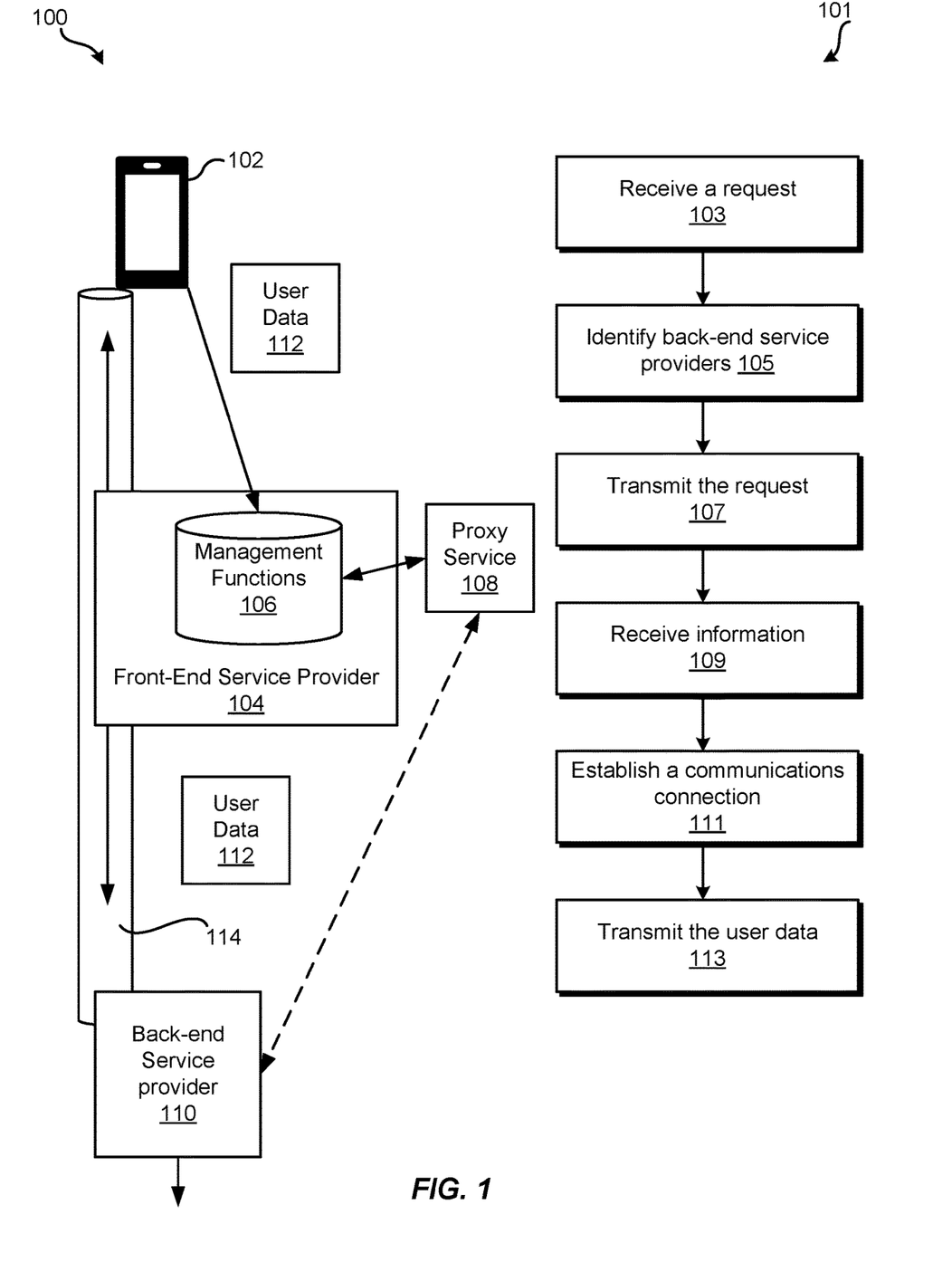
FIG. 1 illustrates a system and process for fulfilling a communications request via a front-end provider and a back-end service provider, according to certain embodiments.

FIG. 1 illustrates a system 100 and process 101 for fulfilling a communications request via a front-end service provider 104 and a back-end service provider 110, according to certain embodiments. The system 100 may include a UE 102, the front-end service provider 104, a proxy service 108, and the back end service provider 110. The front-end service provider 104 may include one or more computing systems and/or devices. The computing systems may include one or more processors, transitory or non-transitory computer-readable media, and other necessary hardware and software components. The computer-readable media may include instructions that may cause the computer systems to perform any of the processes described herein.

The front-end service provider 104 may include components and functionalities described below in FIGS. 6A, 6B, and 7. The front-end service provider 104 may be a 5G stand-alone (SA) network. As such all aspects of the front-end service provider 104 may be 5G-native (e.g., the cellular network 620 and the core 639). The front-end service provider 104 may include management functions 106. The management functions 106 may include a user plane function (UPF), a session management function (SMF), a policy control function (PCF), a network repository function (NRF), and other functions for providing services within a 5G network.

The UE 102 may be a smartphone, tablet, cellular-enabled computing device, or other device capable of communicating with a 5G network. In some embodiments, the UE 102 may be a customer of the front-end service provider 104. In other embodiments, the UE 102 may connect via another service provider's network.

The proxy service 108 may be included in the 5G network associated with the front-end service provider 104. For example, the proxy service 108 may be hosted on cloud-based infrastructure of the front-end service provider 104. Additionally or alternatively, the proxy service 108 may be included in a network outside of the 5G network associated with the front-end service provider 104. In either case, the proxy service 108 may have access to one or more back-end service providers such as the back-end service provider 110. For example, the proxy service 108 may have access to an online marketplace, where the back-end service providers may list available services. The proxy service 108 may be configured to determine a back-end service provider to perform a requested service and determine a CHF associated with the back-end service provider. In some embodiments, the proxy service 108 may have an associated CHF.

At block 103, the front-end service provider 104 may receive a request for communications services from the UE 102. The request for communications for services may include a request for gaming services, video services, voice services, location services, sensor reporting services, data services, or other such services. The request may also include user information 112 (e.g., voice data, video data, etc.). The request may be made via a 5G interface, such as an N3 interface. To communicate the request from a radio access network (RAN) to the front-end service provider. The request may also be made via other appropriate frequencies and/or interfaces.

At block 105, the front-end service provider 104 may identify one or more potential back-end service providers. The front-end service provider 104 may utilize information based on a type of request (e.g., a video service request), the user data 112, one or more policies associated with the request, one or more attributes of the front-end service provider 104, and/or one or more attributes of the back-end service providers to determine a list of potential back-end service providers. For example, the front-end service provider 104 may determine that the service type associated with the request requires a certain throughput and that the front-end service provider 104 is not presently capable of providing the certain throughput. The front-end service provider 104 may then determine that one or more back-end service providers are generally capable of providing the certain throughput. In another example, the front-end service provider 104 may determine that a priority of the request is of high importance and determine that the front-end service provider 104 should also be the back-end service provider. In yet another example, the front-end service provider 104 may determine that a CHF associated with fulfilling the request is of a first cost, and that one or more back-end service providers may have a different CHF. Other factors may include a geographic availability of services associated with the request, contractual obligations associated with the UE 102 and/or front-end service provider 104, and other such factors. One of ordinary skill in the art would recognize many other possibilities and factors.

At block 107, the front-end service provider 104 may provide the request to the proxy service 108. The request may be provided using and an N28 interface and/or an N40 interface. The front-end service provider 104 may also include one or more policies governing the choice of back-end service providers (e.g., service level policies, security policies, contractual requirements/policies. etc.), data associated with cost, and other such information with the request. In some embodiments, the front-end service provider 104 may include one or more instructions based on the policies, data associated with cost, etc. to the proxy service 108. For example, the front-end service provider 104 may include instructions with the request that require a back-end service provider to have and associated CHF that is registered with the front-end service provider 104. In another example, the front-end service provider 104 may include instructions with the request that require a certain amount of bandwidth be provided to fulfil the request. In yet another example, the instructions may include a requirement that a back-end service provider be associated with a CHF having a cost lower than a similar CHF of the front-end service provider 104.

At block 109, the front-end service provider 104 may receive information from the proxy service 108 associated with the back-end service provider 110. The information may be received using the N28 and/or N40 interface. The back-end service provider 110 may be identified by the proxy service 108 based on the one or more policies, instructions, or other factors described above. The back-end service provider 110 may be associated with a business-to-business service (B2B), providing one or more back-end communications services to the front-end service provider 104. Additionally or alternatively, the back-end service provider 110 may be associated with a B2B2x marketplace, where back-end communications services are traded to 5G network providers and/or other providers. In some embodiments, the information may include a CHF associated with the back-end service provider 110. The front-end service provider 104 may then access the NRF to verify that the NRF includes a CHF associated with the back-end service provider 110. If the NRF does not include the CHF associated with the back-end service provider 110, the proxy service 108, back-end service provider 110, and/or the front-end service provider 104 may cause the CHF to be registered with the front-end service provider 104 and included in the NRF.

In other embodiments, the information may not include the CHF associated with the back-end service provider 110. Instead. The proxy service 108 may provide instructions to the front-end service provider 104 relating to charging and/or billing services associated with the back-end service provider 110. The instructions may cause the front-end service provider 104 to determine a CHF associated with the proxy service 108. Using the instructions and/or the information, and the CHF associated with the proxy service 108, the front-end service provider 104 may perform one or more operations associated with the back-end service provider 110 (e.g., a charging operation).

At block 111, the front-end service provider 104 may establish a communications connection 114 between the UE 102 and the back-end service provider 110. The communications connection 114 may include aspects of the front-end service provider's 104 5G network, and thus pass through the front-end service provider's 104 5G network to a network (5G or otherwise) associated with the back-end service provider 110. In some embodiments, the front-end service provider 104 may hand off the communications connection directly to the back-end service provider 110, such that the front-end service provider 104 is no longer involved in the communications connection. In some embodiments, the front-end service provider 104 may provide authentication information associated with the UE 102 and/or the front-end service provider 104 to the back-end service provider. The authentication information may be provided before the communications connection 114 is established or after.

At block 113, the front-end service provider 104 may provide the user data 112 to the back-end service provider 110 via the communications connection 114. Using the communications connection 114 and/or the user data 112, the request for communications services may be fulfilled. The request may be filled at least in part using an N6 interface. It should be understood that any mention of specific 5G interfaces and/or frequencies are merely made for example. Some 5G interfaces may be selected to comply with one or more standards and/or be a choice made by the front-end service provider 104. Additionally, one or more of the functions performed by the system 100 during the process 101 may utilize any combination of appropriate 5G interfaces.

Figure 2:
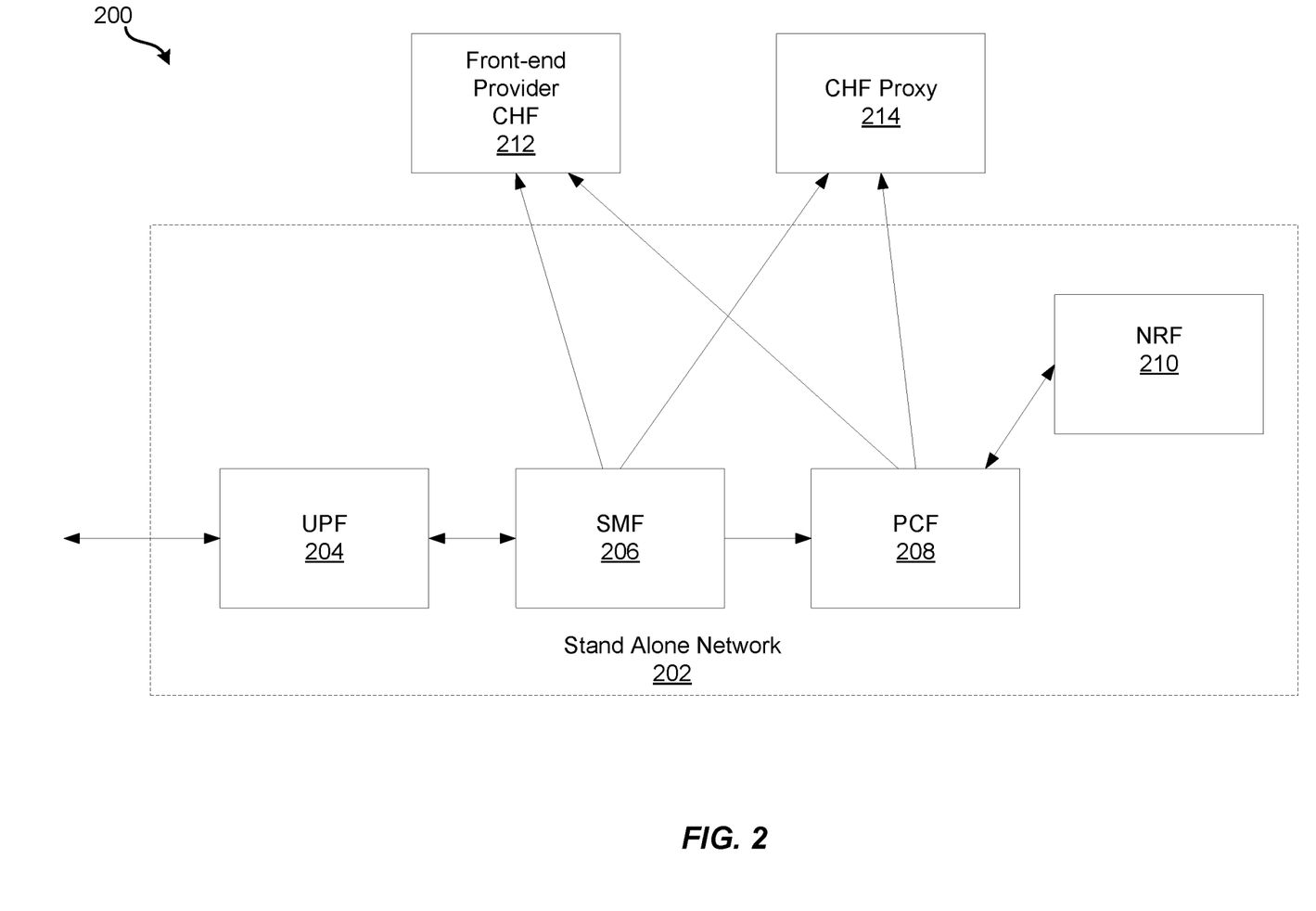
FIG. 2 illustrates a simplified diagram of a 5G system, according to certain embodiments.

FIG. 2 illustrates a simplified diagram of a 5G system 200, according to certain embodiments. The system 200 may include a SA network 202 with an UPF, 204, a SMF 206, a PCF 208, and an NRF 210. The system 200 may also include a front-end service provider CHF (FE CHF) 212 and a CHF proxy 214. The system 200 may be similar to some or all of the system 100 in FIG. 1. For example, the SA network 202 may be a 5G network associated with the front-end service provider 104, and the CHF proxy 214 may be similar to the proxy service 108. Although the FE CHF 212 and the CHF proxy 214 are shown as being outside of the SA network 202, one or both may be included in the SA network 202.

The UPF 204 may interact with a UE (e.g., the UE 102) via a radio access network (RAN). The RAN may include one or more cellular networks and other such networks for communicating with the one or more UE's. The UPF 204 may also control routing of data received (or sent) with the UE. The UPF 204 may route data to other networks (e.g., the internet) or to other modules/nodes within the SA network 202. In relation to FIG. 1, the UPF 204 may receive the request for communications services from the UE. The UPF 204 may then determine one or more data paths within the SA network 202 used to fulfil the request. For example, the UPF 204 may transmit some or all of the request to the SMF 206 and/or the PCF 208. The UPF 204 may also provide data to the UE received via the communications connection 114 from the back-end service provider 110.

The SMF 206 may create and/or maintain sessions between the SA network 202 and other entities. For example, the request may include a request for a communications connection to a user. The SMF 206 may then establish a session between the FE CHF 212 and the rest of the SA network 202. The SMF 206 may execute one or more operations associated with the FE CHF and/or verify operations performed using the FE CHF 212. The SMF 206 may then establish a session to fulfil the request. Additionally or alternatively, the SMF 206 may establish a session with the CHF proxy 214 in response to a determination that one or more back-end service providers may be used to fulfill the request. Via the session, the CHF proxy 214 may provide a CHF associated with a back-end service provider 110 and/or instructions associated with a CHF stored on the NRF 210.

The PCF 208 may include and/or access historical data and/or one or more policies associated with the request, the front-end service provider, one or more back-end service providers, the UE (or associated user), and other such policies. The PCF 208 may receive some or all of the request from the UPF 204 and/or the SMF 206. The PCF 208 may check some or all of the request against the one or more policies. For example, the request may include a request to provide a number of video streams to the UE. A policy may indicate that the number of video streams may be provided by the front-end service provider at a first cost. The PCF 208 may also determine, based at least in part on one or more other policies and/or historical data, that the number of video streams may be provided by a back-end service provider at a second cost, less than the first cost. The PCF 208 may therefore communicate with the SMF 206 to establish a session with the CHF proxy 214, such that the request may be fulfilled by the back-end service provider.

The PCF 208 may also access the NRF 210, at least in part to verify that a CHF is registered by the NRF 210. The PCF 208 may access the NRF 210 prior to the SMF 206 establishing any external session. For example, the request may be a high priority request. The PCF 208 may then determine, based at least in part on the one or more policies, that the request may only be filled by a specific back-end provider. The PCF 208 may then access the NRF 210 to confirm that a CHF associated with the specific back-end service provider 110 is registered prior to SMF 206 establishing the session.

In some embodiments, the PCF 208 may access the NRF 210 at least in part based on information received from the CHF proxy 214. For example, the CHF proxy 214 may provide a CHF associated with a back-end service provider. The PCF 208 may determine that the CHF is not registered in the NRF 210. The PCF 208 may then confirm that the back-end service provider is permitted by accessing the one or more policies and/or historical data. The PCF 208 may then (at least in part) cause the CHF to be registered in the NRF 210. In another example, the CHF proxy 214 may include instructions associated the back-end provider to the PCF 208. Via the PCF 208, the instructions may be used by the front-end service provider using a CHF associated with the CHF proxy 214 to perform charging/billing functions. It should be understood that there may be intermediary functions and/or module in addition to the PCF 208.

The NRF 210 may include one or more CHFs associated with various back-end service providers, users, customers, and other entities. The NRF 210 may also include an application programming interface (API) that allows 5G functions to access other 5G functions. For example, the NRF 210 may include an API that allows the CHF proxy 214 to register a CHF directly with the NRF 210.

Figure 3:
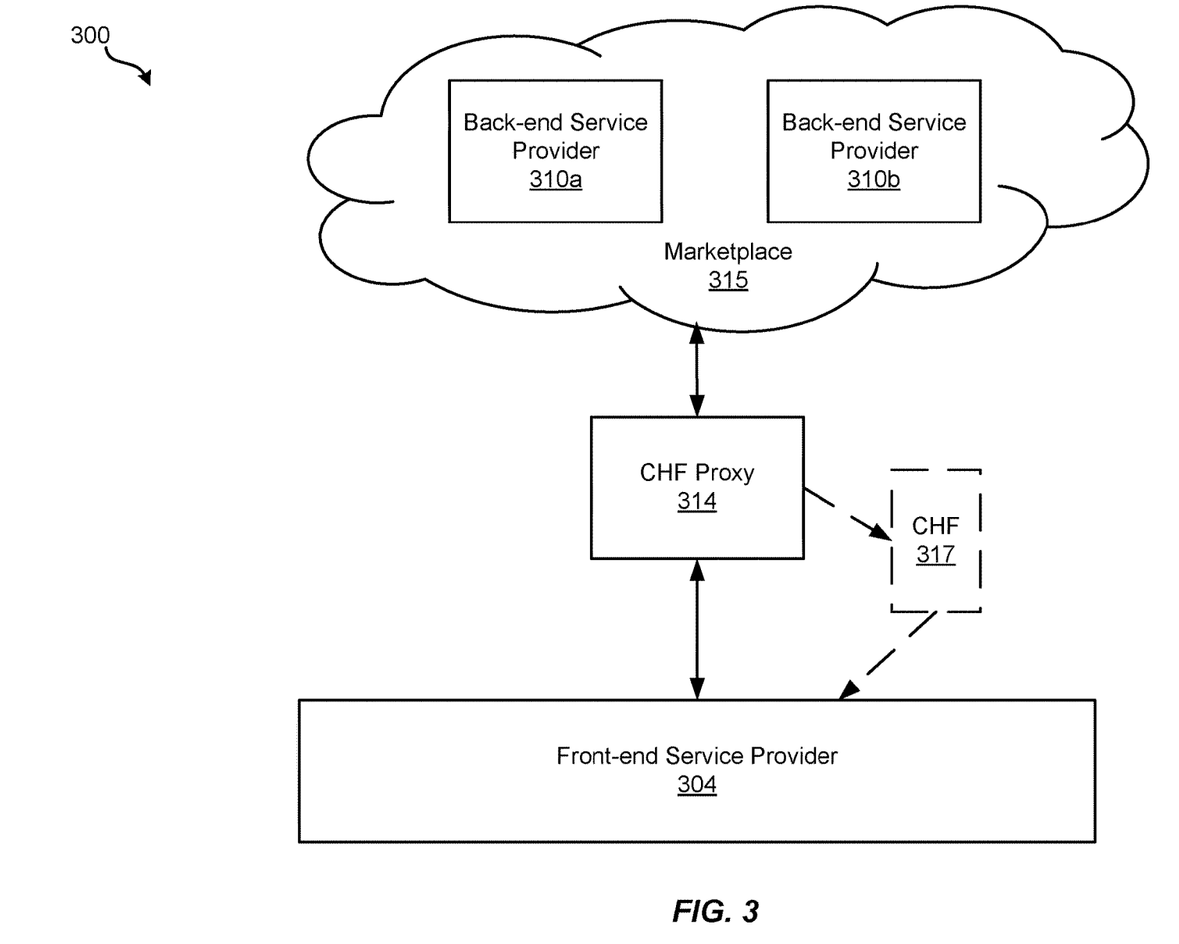
FIG. 3 illustrates a simplified diagram of a system for providing a charging function to a front-end service provider, according to certain embodiments.

FIG. 3 illustrates a simplified diagram of a system 300 for providing a CHF 317 to a front-end service provider 304, according to certain embodiments. The system 300 may include a front-end service provider 304, a CHF proxy 314, and a marketplace 315. The front-end service provider 304 may be similar to the front-end service provider 104 in FIG. 1, and include components and functionalities described therein and in relation to FIG. 2. More specifically, the system 300 may be used to determine an appropriate CHF for a back-end service provider accessed from the marketplace 315. The CHF proxy 314 may be similar to the CHF proxy 214 in FIG. 2.

The front-end service provider 304 may receive a request for a communications service from a UE. Based on one or more policies, a service type, and other attributes, the front-end service provider 304 may determine that one or more back-end service providers may be used to fulfill the request. According to the above, the front-end service provider 304 may transmit some or all of the information in the request to the CHF proxy 314 (or a related service). The information may include permissions allowing the request to be put on an online marketplace, such as the marketplace 315.

The CHF proxy 314 may then transmit some or all of the request to the marketplace 315. Additionally or alternatively, the CHF proxy 314 may access the marketplace 315. The marketplace 315 may include information associated with one or more back-end service providers 310*a-b*. The information may include service levels, bandwidth guarantees, service capacity, and other such information. The information may also include CHF's and cost information associated with the back-end service providers 310*a-b*.

After determining one of the back-end service providers 310*a-b* to fulfill the request, the CHF proxy 314 may access the CHF 317 associated with chosen back-end service provider. In some embodiments, the CHF proxy 314 may provide the CHF 317 to the front-end service provider 304. The front-end service provider 304 may then determine that the CHF 317 is registered with the front-end service provider 304 (e.g., in the NRF 210 in FIG. 2). The front-end service provider 304 may then establish a communications connection with the back-end service provider such that the request is fulfilled.

In some embodiments, the CHF 317 may not be registered with the front-end service provider 304. The CHF proxy 314 may then provide one or more components of the front-end service provider 304 with information and/or instructions to register the CHF 317. In some embodiments, the CHF proxy 314 may interact with the NRF to register the CHF 317. In other embodiments, the CHF proxy 314 may interact with other components of the front-end service provider 304.

In yet other embodiments, the CHF proxy 314 may not provide the CHF 317. Instead, the CHF proxy 314 may provide instructions to the front-end service provider 304. The instructions may cause the front-end service provider 304 to access a CHF associated with the CHF proxy 314 and/or the marketplace 315. The CHF 317 may also be associated with a charging-as-a-service (CaaS) entity. The instructions may further cause one or more computing systems to perform operations associated via the CHF.

Figure 4:
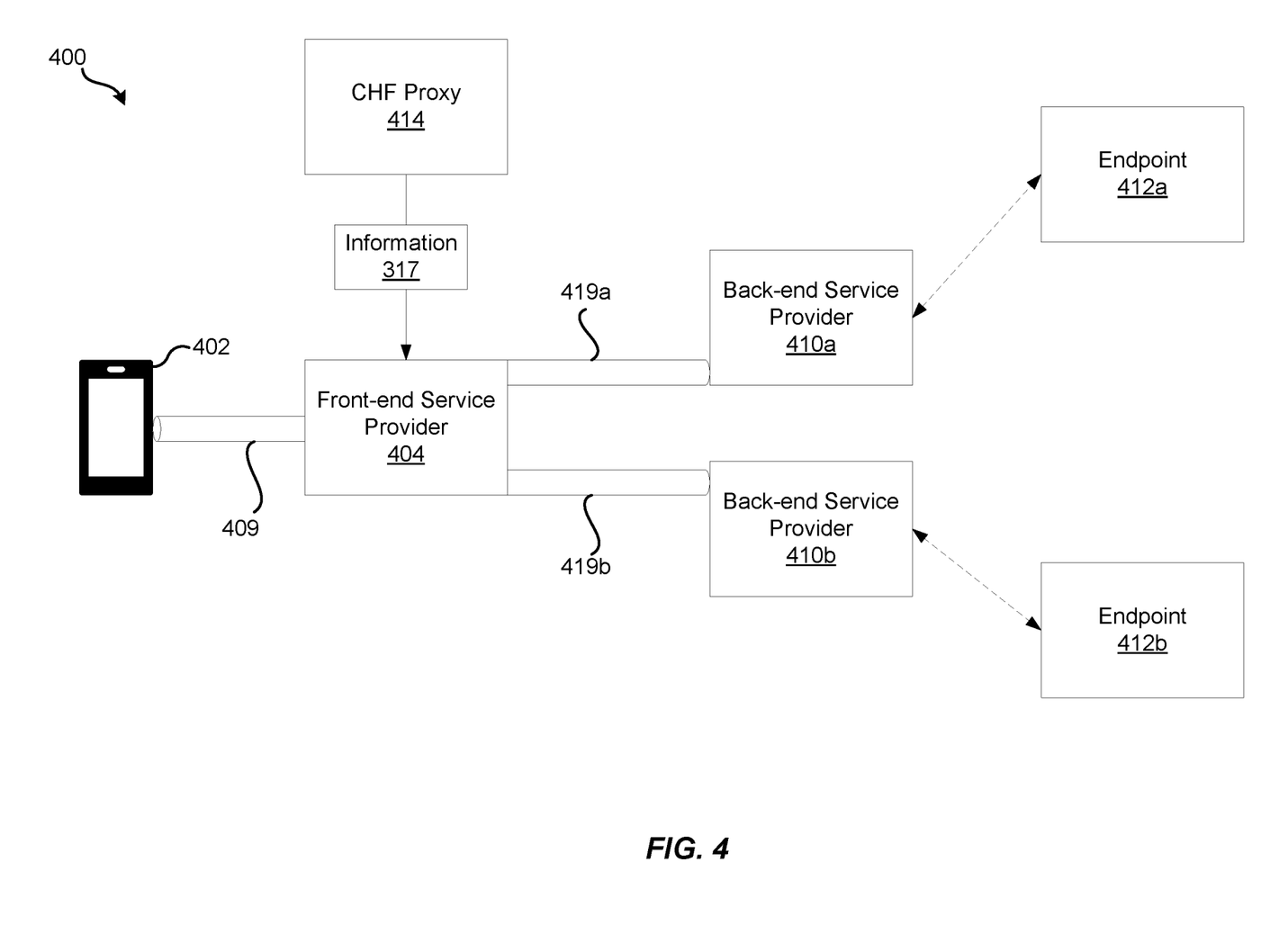
FIG. 4 illustrates a block diagram for providing a communications service to a UE using two back-end service providers, according to certain embodiments.

FIG. 4 illustrates a block diagram 400 for providing a communications service to a UE 402 using two back-end service providers 410*a-b*, according to certain embodiments. The diagram 400 may include the UE 402, a front-end service provider 404, a CHF proxy 414, and the back-end service providers 410*a-b*. The UE 402 may be similar to the UE 102 in FIG. 1. The front-end service provider 404 may be similar to the front-end service provider 104 in FIG. 1, and include similar components and functionalities described therein and in relation to FIG. 2. Similarly, the CHF proxy 414 may be similar to the CHF proxy 314 in FIG. 3. The back-end service providers 410a-b may be similar to the back-end service providers 310a-b, The back-end service providers 410a-b may be accessed by the CHF proxy through a marketplace such as the marketplace 315 or by any other method.

The front-end service provider 404 may receive a request for communications services from the UE 102 via a communications connection 409. For example, the request may be for video services with multiple connections to endpoints 412a-b. The endpoints 412a-b may be in different locations with different infrastructure. For example, the endpoint 412a may be located in California, and the endpoint 412b may be located in Sweden. The front-end service provider 404 may determine that the request may be fulfilled by or in conjunction with the back-end service providers 410a-b by using one or more policies, historical data, or other information. For example, the back-end service provider 410a may provide network connectivity in California, whereas the back-end service provider 410b may provide network connectivity in Sweden.

The front-end service provider 404 may then transmit some or all of the request (and/or related information) to the CHF proxy 414. Additionally or alternatively, the front-end service provider 404 may identify one or more of the back-end service providers 410a-bm and transmit information accordingly to the CHF proxy 414. In either case, the CHF proxy 414 may provide information 417 associated with one or more of the back-end service providers 410a-b. The instructions may identify one or more CHFs, registered with the front-end service provider 404. For example, the information 417 may include an identifier corresponding to the back-end service provider 410a and data for input into a CHF associated with the back-end service provider 410a. The front-end service provider 404 may then use some or all of the information 417 to perform charging/billing operations using the associated CHF.

The information 417 may also include input for a CHF corresponding to the CHF proxy 414 associated with the back-end service provider 410b. The front-end service provider 404 may then use the input and the CHF corresponding to the CHF proxy 414 to perform charging/billing operations.

The front-end services provider 404 may then establish communication connections 419a-b with back-end service providers 410a-b, respectively. The communication connections 419a-b may then be used to fulfill the request for video services. Thus, the UE 402 may join video services with the endpoint 412a in California via the back-end service provider 410a and communications connections 409 and 419a. The UE 402 may join video services with the endpoint 412b in Sweden via the back-end service provider 410b and communications connections 409 and 419b. The front-end service provider 404 and/or the UE 402 may experience better performance, such as a faster connection by using the back-end service providers 410a-b. Furthermore, the front-end service provider 404 may also be more efficient in executing the relevant CHFs, as at least some of the processing required may be performed by the CHF proxy 414.

Figure 5:
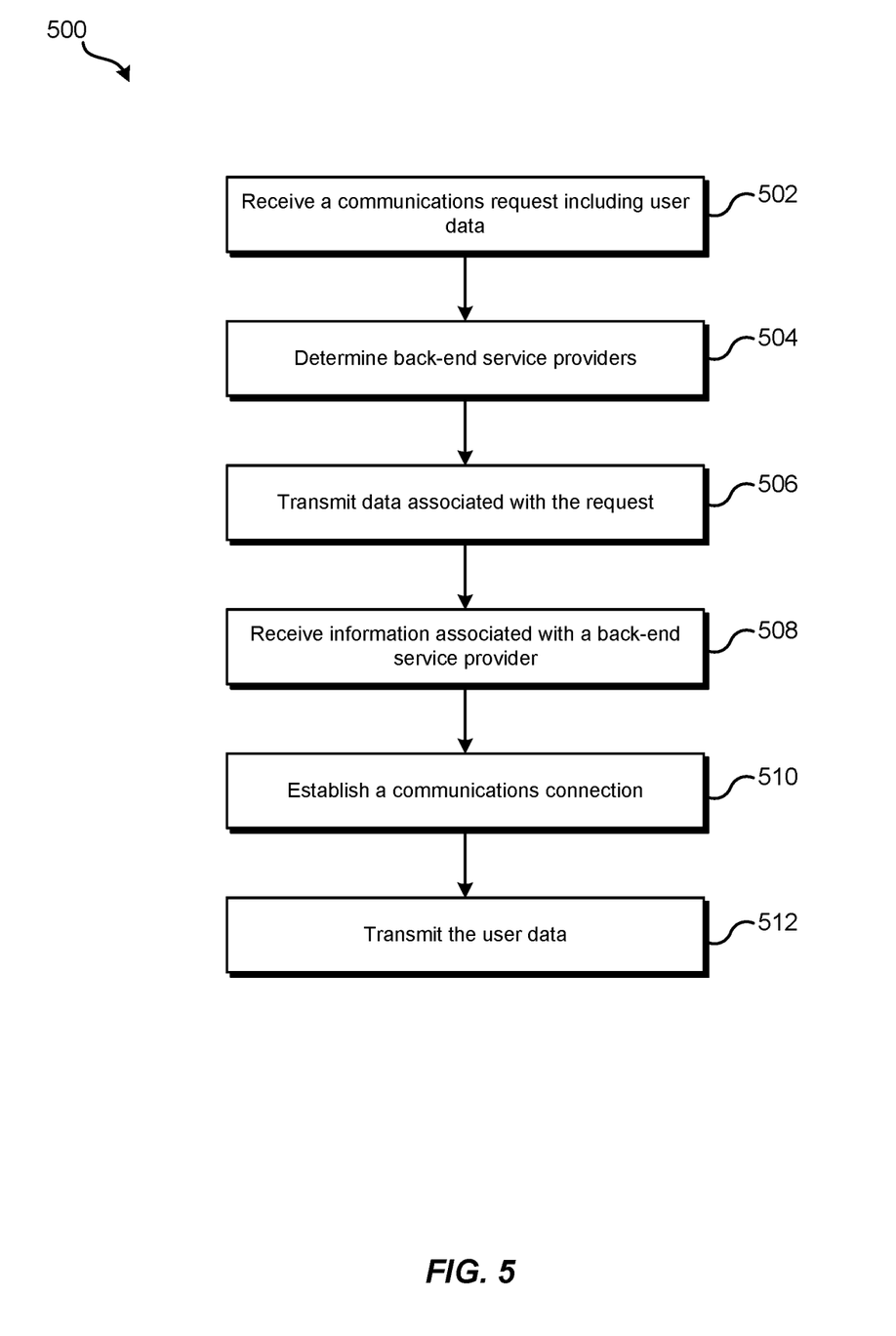
FIG. 5 illustrates a flowchart of a method for fulfilling a communications request, according to certain embodiments.

FIG. 5 illustrates a flowchart of a method 500 for fulfilling a communications request, according to certain embodiments. The method 500 may be performed by some or all of the system described herein, such as the system 100 in FIG. 1 and the system 200 in FIG. 2. In some embodiments, the steps of method 500 may be performed out of order and/or skipped entirely. At step 502, the method 500 may include receive a communications request by a computing system of a front-end service provider. The front-end service provider may be similar to the front-end service provider 104 in FIG. 1, and include similar components and functionalities described therein and in relation to FIG. 2. The request may include user data (e.g., video or call data). The computing system may include one or more components such as is described in FIG. 2.

At step 504, the method 500 may include determining the one or more back-end service providers can fulfil the request. In some embodiments, the computing system may access one or more policies associated with the front-end service provider, a sender of the request (e.g., a UE and/or related user), and/or the front-end service provider. The computing system may also access one or more provider attributes associated with the back-end service providers. The one or more provider attributes may include a CHF, a service level, a service region, a service capacity, a bandwidth guarantee, and other such attributes. Determining the one or more back-end service providers may be performed by some or all of the components described in FIG. 2.

At step 506, the method 500 may include transmitting, by the computing system, data associated with the communications request and/or the one or more back-end service providers to a proxy service. For example, the computing system may transmit some or all of the request. The computing system may provide instruction to the proxy service, used to identify one or more back-end services, as described in FIG. 1. Additionally or alternatively, the computing system may provide information identifying a specific back-end service provider.

At step 508, the method 500 may include receiving, by the computing system, data associated with a back-end service provider from the proxy service. The data may be similar to the information 417 described in relation to FIG. 4. As such, the information may include identifiers corresponding to one or more CHFs registered with the front-end service provider, a CHF not registered with the front-end service provider, and/or instructions causing the computing system to perform operations using one a CHF. In some embodiments, the instructions may include identifying a CHF associated with the proxy service. In some embodiments, the front-end service provider may determine a CHF associated with the back-end service provider based in part on a CHF registry (e.g., included in the NRF 210 in FIG. 2). In some embodiments, information and/or CHF may be associated with an online marketplace, such as the marketplace 315 in FIG. 3. In some embodiments, the CHF may be associated with a CaaS entity.

At step 510, the method 500 may include establishing, by the computing system, a communications connection with the back-end service provider. The communications connection may be similar to the communications connection 114 in FIG. 1. The communications connection may therefore by provided by both the front-end service provider and the back-end service provider. In some embodiments, the front-end service provider may handoff the communications connection such that the UE is communicating directly through the back-end service provider.

At step 512, the method 500 may include transmitting, by the computing system, the user data such that the communications request is fulfilled. In some embodiments, the front-end service provider and/or the back-end service may facilitate the transmission of data between the UE and an endpoint. In some embodiments, the communications may be fulfilled by a plurality of back-end service providers, as is described in FIG. 4.

Figure 6A:
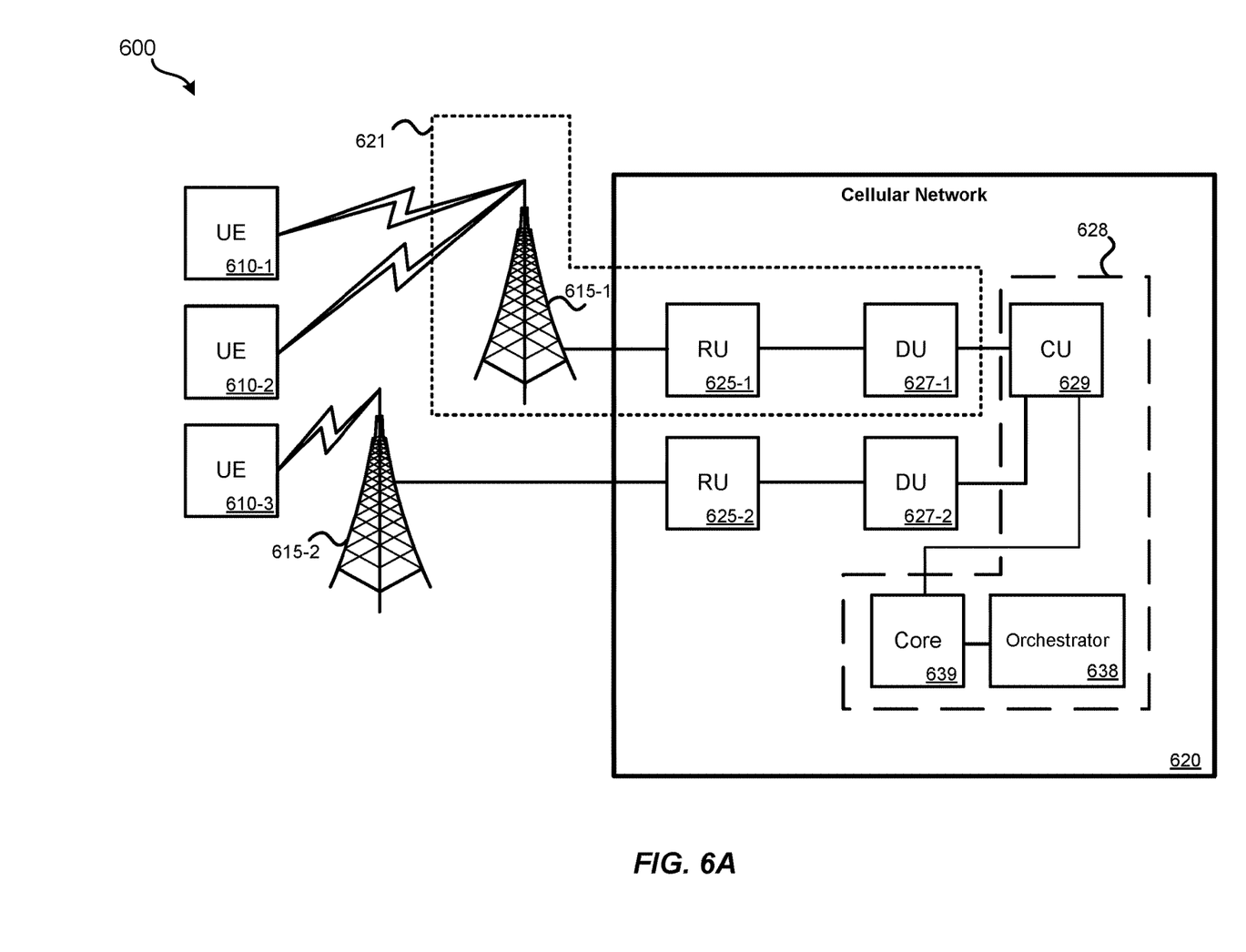
FIG. 6A illustrates an embodiment of a cellular network system, according to certain embodiments.

FIG. 6A illustrates an embodiment of a cellular network system 600 ("system 600"). System 600 can include a 5G New Radio (NR) cellular network; other types of cellular networks, such as 4G LTE, 6G, 7G, etc. are also possible. System 600 can include: UE 610 (UE 610-1, UE 610-2, UE 610-3); base station 615; cellular network 620; radio units 625 ("RUs 625"); distributed units 627 ("DUs 627"); centralized unit 629 ("CU 629"); core 639, and orchestrator 638. FIG. 6A represents a component level view. In a virtualized open radio access network (O-RAN), because components can be implemented as software in the cloud, except for components that need to receive and transmit RF, the functionality of various components can be shifted among different servers, for which the hardware may be maintained by a separate (public) cloud-service provider, to accommodate where the functionality of such components is needed, as detailed in relation to FIG. 7.

UE 610 can represent various types of end-user devices, such as smartphones, cellular modems, cellular-enabled computerized devices, sensor devices, manufacturing equipment, gaming devices, access points (APs), any computerized device capable of communicating via a cellular network, etc. UE can also represent any type of device that has incorporated a 5G interface, such as a 5G modem. Examples include sensor devices, Internet of Things (IoT) devices, manufacturing robots; unmanned aerial (or land-based) vehicles, network-connected vehicles, environmental sensors, etc. UE 610 may use RF to communicate with various base stations of cellular network 620. As illustrated, two base stations 615 (BS 615-1, 615-2) are illustrated. Real-world implementations of system 600 can include many (e.g., hundreds, thousands) of base stations, and many RUs, DUs, and CUs. BS 615 can include one or more antennas that allow RUs 625 to communicate wirelessly with UEs 610. RUs 625 can represent an edge of cellular network 620 where data is transitioned to wireless communication. The radio access technology (RAT) used by RU 625 may be 5G New Radio (NR), or some other RAT, such as 4G Long Term Evolution (LTE). The remainder of cellular network 620 may be based on an exclusive 5G architecture, a hybrid 4G/5G architecture, a 4G architecture, or some other cellular network architecture. Base station equipment 621 may include an RU (e.g., RU 625-1) and a DU (e.g., DU 627-1) located on site at the base station. In some embodiments, the DU may be physically remote from the RU. For instance, multiple DUs may be housed at a central location and connected to geographically distant (e.g., within a couple kilometers) RUs.

One or more RUs, such as RU 625-1, may communicate with DU 627-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 627-1, may communicate with CU 629. Collectively, RUs, DUs, and CUs create a gNodeB, which serves as the radio access network (RAN) of cellular network 620. CU 629 can communicate with core 639. The specific architecture of cellular network 620 can vary by embodiment. Edge cloud server systems outside of cellular network 620 may communicate, either directly, via the Internet, or via some other network, with components of cellular network 620. For example, DU 627-1 may be able to communicate with an edge cloud server system without routing data through CU 629 or core 639. Other DUs may or may not have this capability.

At a high level, the various components of a gNodeB can be understood as follows: RUs perform RF-based communication with UE. DUs support lower layers of the protocol stack such as the radio link control (RLC) layer, the medium access control (MAC) layer, and the physical communication layer. CUs support higher layers of the protocol stack such as the service data adaptation protocol (SDAP) layer, the packet data convergence protocol (PDCP) layer and the radio resource control (RRC) layer. A single CU can provide service to multiple co-located or geographically distributed DUs. A single DU can communicate with multiple RUs.

Figure 6B:
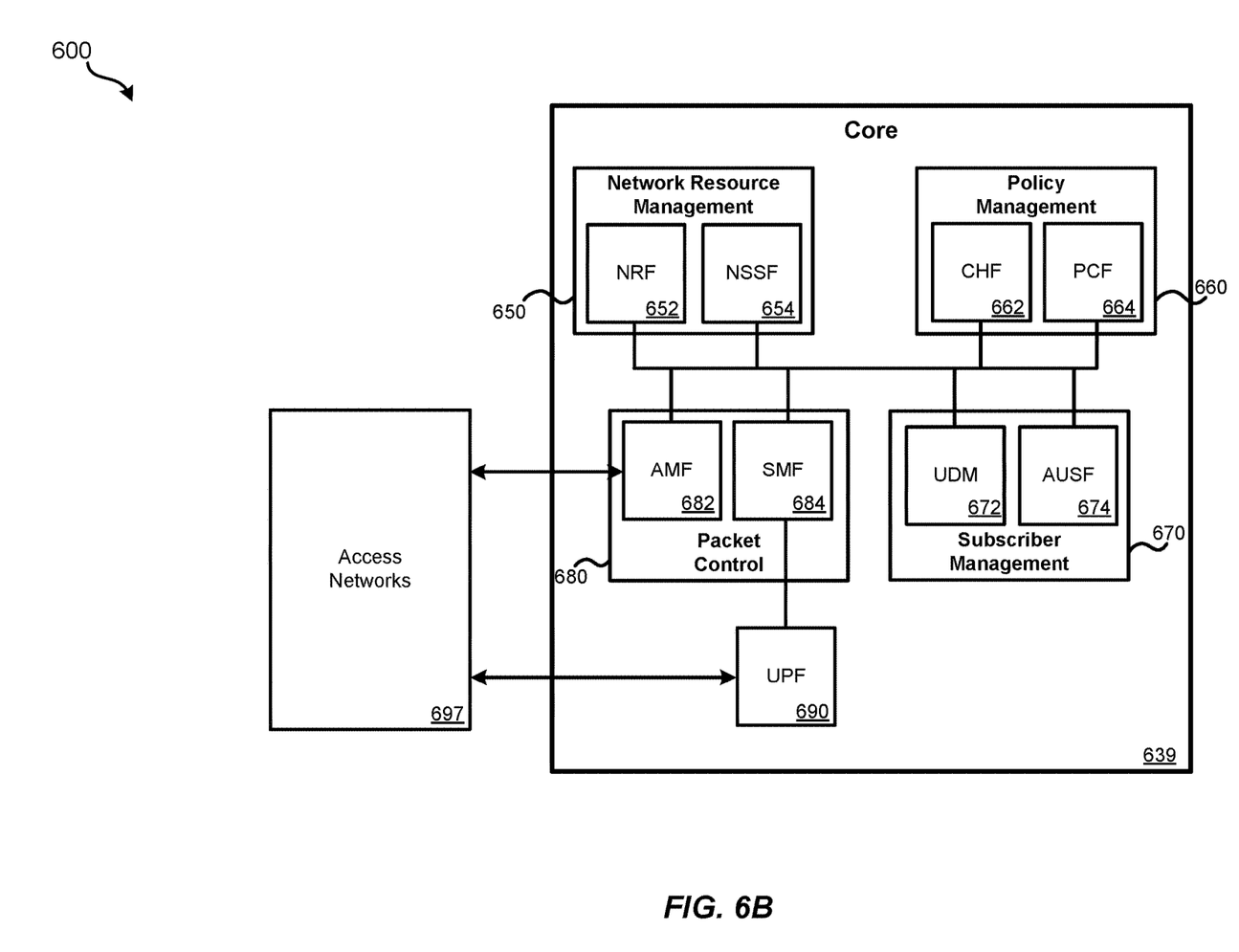
FIG. 6B illustrates an embodiment of a core of a cellular network system, according to certain embodiments.

Further detail regarding exemplary core 639 is provided in relation to FIG. 6B. Core 639, which can be physically distributed across data centers or located at a central national data center (NDC) as detailed in relation to FIG. 7, can perform various core functions of the cellular network. Core 639 can include: network resource management components 650; policy management components 660; subscriber management components 670; and packet control components 680. Individual components may communicate on a bus, thus allowing various components of core 639 to communicate with each other directly. Core 639 is simplified to show some key components. Implementations can involve additional other components.

Network resource management components 650 can include: Network Repository Function (NRF) 652 and Network Slice Selection Function (NSSF) 654. NRF 652 can allow 5G network functions (NFs) to register and discover each other via a standards-based application programming interface (API). NSSF 654 can be used by AMF 682 to assist with the selection of a network slice that will serve a particular UE.

Policy management components 660 can include: Charging Function (CHF) 662 and Policy Control Function (PCF) 664. CHF 662 allows charging services to be offered to authorized network functions. Converged online and offline charging can be supported. PCF 664 allows for policy control functions and the related 5G signaling interfaces to be supported.

Subscriber management components 670 can include: Unified Data Management (UDM) 672 and Authentication Server Function (AUSF) 674. UDM 672 can allow for generation of authentication vectors, user identification handling, NF registration management, and retrieval of UE individual subscription data for slice selection. AUSF 674 performs authentication with UE.

Packet control components 680 can include: Access and Mobility Management Function (AMF) 682 and Session Management Function (SMF) 684. AMF 682 can receive connection- and session-related information from UE and is responsible for handling connection and mobility management tasks. SMF 684 is responsible for interacting with the decoupled data plane, creating updating and removing Protocol Data Unit (PDU) sessions, and managing session context with the User Plane Function (UPF).

User plane function (UPF) 690 can be responsible for packet routing and forwarding, packet inspection, QoS handling, and external PDU sessions for interconnecting with a Data Network (DN) 695 (e.g., the Internet) or various access networks 697. Access networks 697 can include the RAN of cellular network 620 of FIG. 6A.

While FIGS. 6A and 6B illustrate various components of cellular network 620, it should be understood that other embodiments of cellular network 620 can vary the arrangement, communication paths, and specific components of cellular network 620. While RU 625 may include specialized radio access componentry to enable wireless communication with UE 610, other components of cellular network 620 may be implemented using either specialized hardware, specialized firmware, and/or specialized software executed on a general-purpose server system. In a virtualized arrangement, specialized software on general-purpose hardware may be used to perform the functions of components such as DU 627, CU 629, and core 639. Functionality of such components can be co-located or located at disparate physical server systems. For example, certain components of core 639 may be co-located with components of CU 629.

In a possible O-RAN implementation, DUs 627, CU 629, core 639, and/or orchestrator 638 can be implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 600, cloud-based cellular network components 628 include CU 629, core 639, and orchestrator 638. In some embodiments, DUs 627 may be partially or fully added to cloud-based cellular network components 628. Such cloud-based cellular network components 628 may be executed as specialized software executed by underlying general-purpose computer servers. Cloud-based cellular network components 628 may be executed on a public third-party cloud-based computing platform or a cloud-based computing platform operated by the same entity that operates the RAN. A cloud-based computing platform may have the ability to devote additional hardware resources to cloud-based cellular network components 628 or implement additional instances of such components when requested. A "public" cloud-based computing platform refers to a platform where various unrelated entities can each establish an account and separately utilize the cloud computing resources, the cloud computing platform managing segregation and privacy of each entity's data.

Kubernetes, or some other container orchestration platform, can be used to create and destroy the logical DU, CU, or 5G core units and subunits as needed for the cellular network 620 to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU no longer exists, Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 638. Orchestrator 638 can represent various software processes executed by underlying computer hardware. Orchestrator 638 can monitor cellular network 620 and determine the amount and location at which cellular network functions should be deployed to meet or attempt to meet service level agreements (SLAs) across slices of the cellular network.

Orchestrator 638 can allow for the instantiation of new cloud-based components of cellular network 620. As an example, to instantiate a new DU, orchestrator 638 can perform a pipeline of calling the DU code from a software repository incorporated as part of, or separate from, cellular network 620; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 620. Cellular network 620 is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 625-1 and DU 627-1, a second set of network slices, which may only partially overlap or may be wholly different from the first set, may be reserved at RU 625-2 and DU 627-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

As illustrated in FIG. 6A, UE 610 may be operating on one or more production slices of cellular network 620. As detailed later in this document, UE that function on a particular entity's local network may be assigned to a slice particular to the entity or a slice that provides a particular QoE for tasks to be performed by the entity's UE.

Components such as DUs 627, CU 629, orchestrator 638, and core 639 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 7:
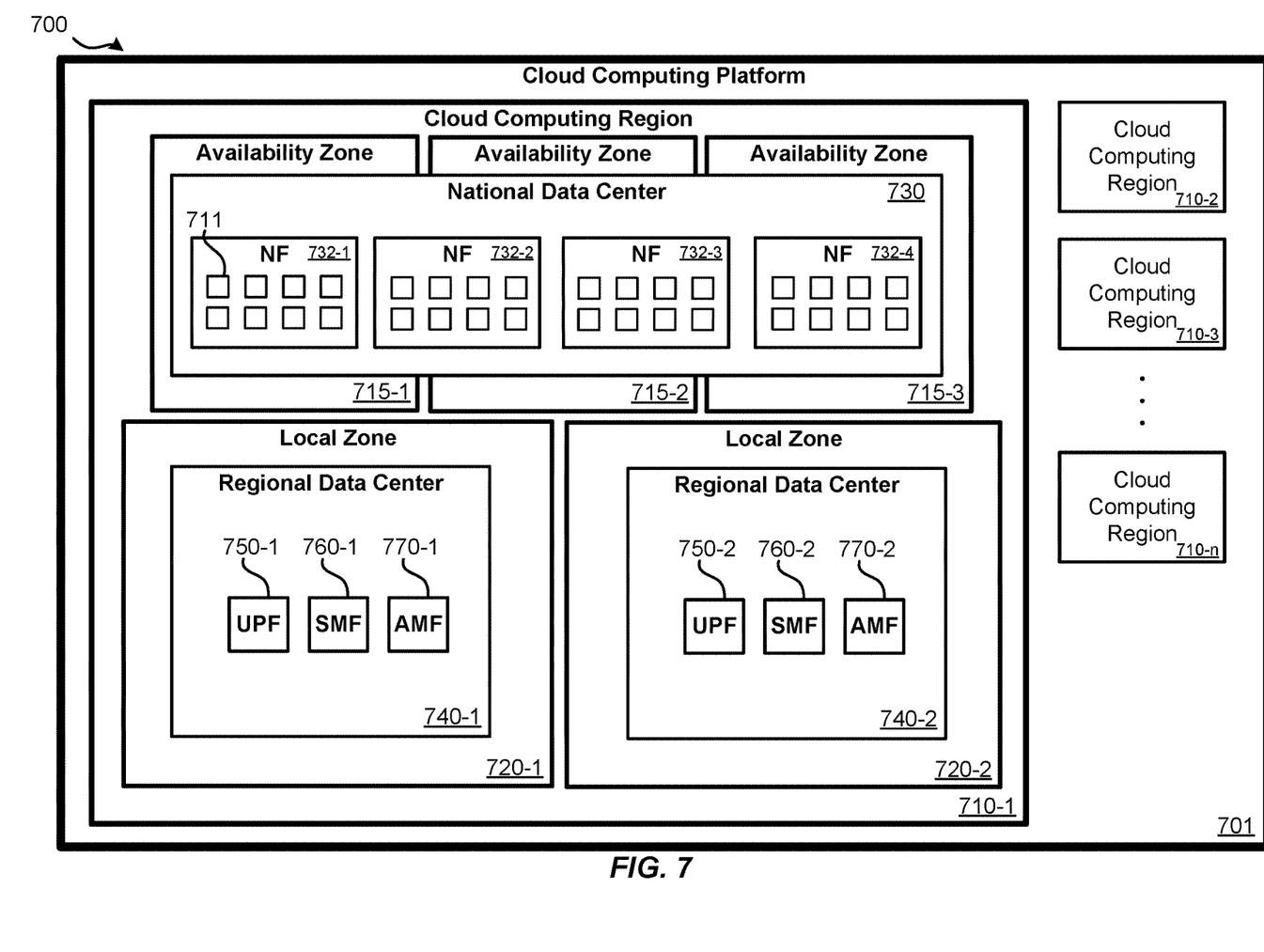
FIG. 7 illustrates an embodiment of a cellular network core network topology 700 as implemented on a public cloud-computing platform.

FIG. 7 illustrates an embodiment of a cellular network core network topology 700 as implemented on a public cloud-computing platform. Cellular network core network topology 700 can represent how logical cellular network groups are distributed across cloud computing infrastructure of cloud computing platform 701. Cloud computing platform 701 can be logically and physically divided up into various different cloud computing regions 710. Each of cloud computing regions 710 can be isolated from other cloud computing regions to help provide fault tolerance, fail-over, load-balancing, and/or stability and each of cloud computing regions 710 can be composed of multiple availability zones, each of which can be a separate data center located in general proximity to each other (e.g., within 600 miles). Further, each of cloud computing regions 710 may provide superior service to a particular geographic region based on physical proximity. For example, cloud computing region 710-1 may have its datacenters and hardware located in the northeast of the United States while cloud computing region 710-2 may have its datacenters and hardware located in California. For simplicity, the details of the cellular network as executed in only cloud computing region 710-1 is illustrated. Similar components may be executed in other cloud computing regions of cloud computing regions 710 (210-2, 710-3, 710-*n*).

In other embodiments, cloud computing platform 701 may be a private cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

Each of cloud computing regions 710 may include multiple availability zones 715. Each of availability zones 715 may be a discrete data center or group of data centers that allows for redundancy that allows for fail-over protection from other availability zones within the same cloud computing region. For example, if a particular data center of an availability zone experiences an outage, another data center of the availability zone or separate availability zone within the same cloud computing region can continue functioning and providing service. A logical cellular network component, such as a national data center, can be created in one or across multiple availability zones 715. For example, a database that is maintained as part of NDC 730 may be replicated across availability zones 715; therefore, if an availability zone of the cloud computing region is unavailable, a copy of the database remains up-to-date and available, thus allowing for continuous or near continuous functionality.

On a (public) cloud computing platform, cloud computing region 710-1 may include the ability to use a different type of data center or group of data centers, which can be referred to as local zones 720. For instance, a client, such as a provider of the hybrid cloud cellular network can select from more options of the computing resources that can be reserved at an availability zone compared to a local zone. However, a local zone may provide computing resources nearby geographic locations where an availability zone is not available. Therefore, to provide low latency, certain network components, such as regional data centers, can be implemented at local zones 720 rather than availability zones 715. In some circumstances, a geographic region can have both a local zone and an availability zone.

In the topology of a 5G NR cellular network, 5G core functions of core 639 can logically reside as part of a national data center (NDC). NDC 730 can be understood as having its functionality existing in cloud computing region 710-1 across multiple availability zones 715. At NDC 730, various network functions, such as NFs 732, are executed.

For illustrative purposes, each NF, whether at NDC 730 or elsewhere located, can be comprised of multiple subcomponents, referred to as pods (e.g., pod 711) that are each executed as a separate process by the cloud computing environment. The illustrated number of pods is merely an example; fewer or greater numbers of pods may be part of the respective 5G core functions. It should be understood that in a real-world implementation, a cellular network core, whether for 5G or some other standard, can include many more network functions. By distributing NFs 732 across availability zones, load-balancing, redundancy, and fail-over can be achieved. In local zones 720, multiple regional data centers 740 can be logically present. Each of regional data centers 740 may execute 5G core functions for a different geographic region or group of RAN components. As an example, 5G core components that can be executed within an RDC, such as RDC 740-1, may be: UPFs 750, SMFs 760, and AMFs 770. While instances of UPFs 750 and SMFs 760 may be executed in local zones 720, SMFs 760 may be executed across multiple local zones 720 for redundancy, processing load-balancing, and fail-over.

While the invention has been described in detail, modifications within the spirit and scope of the invention will be readily apparent to those of skill in the art. It should be understood that aspects of this invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only and is not intended to limit the invention. All US patents and publications cited herein are incorporated by reference in their entirety.

What is claimed is:

1. A method, comprising:
   receiving, by a computing system of a front-end service provider, a communications request including user data;
   determining, by the computing system of the front-end service provider, that one or more back-end service providers can fulfil the communications request, wherein the one or more back-end service providers are different from the front-end service provider;
   transmitting, by the computing system of the front-end service provider, data associated with the communications request and/or the one or more back-end service providers to a charging function (CHF) proxy service, the data indicating requirements of the communications request comprising at least one of a bandwidth requirement, a cost requirement, or a charging function (CHF) registration requirement;
   receiving, by the computing system of the front-end service provider and from the CHF proxy service, information associated with a back-end service provider of the one or more back-end service providers, the information comprising at least one of a first CHF associated with the back-end service provider or a second CHF associated with the CHF proxy service;
   establishing, by the computing system of the front-end service provider, a communications connection with the back-end service provider; and
   transmitting, by the front-end service provider and to the back-end service provider, the user data such that the communications request is fulfilled.

2. The method of claim 1, wherein determining, by the computing system of the front-end service provider, that one or more back-end service providers can fulfil the communications request further comprises:
- accessing, by the computing system of the front-end service provider, one or more policies associated with at least one of the communications request, a sender of the communications request, and policies associated with the front-end service provider; and
- accessing, by the computing system of the front-end service provider, one or more provider attributes associated with the back-end service providers.

3. The method of claim 2, wherein the one or more provider attributes associated with the one or more back-end service providers comprise at least one of a CHF, a service level, and a service capacity.

4. The method of claim 1, wherein the computing system of the front-end service provider determines the charging function associated with the back-end service provider based at least in part on a charging function registry.

5. The method of claim 1, wherein the computing system of the front-end service provider provides authentication information associated with a user equipment (UE) of the communications request to the back-end service provider after the communications connection is established.

6. The method of claim 1, wherein the information associated with a back-end service provider of the one or more back-end service providers comprises information associated with an online marketplace.

7. The method of claim 1, wherein a charging function associated with the back-end service provider is also associated with a charging-as-a-service entity.

8. The method of claim 1, wherein communications request is fulfilled by a plurality of back-end service providers.

9. A computing system of a front-end service provider, comprising:
- one or more processors;
- non-transitory computer-readable memory comprising instructions that, when executed by the one or more processors, cause the computing system to perform operations to:
  - receive, by the computing system of the front-end service provider, a communications request including user data;
  - determine, by the computing system of the front-end service provider, that one or more back-end service providers can fulfil the communications request, wherein the one or more back-end service providers are different from the front-end service provider;
  - transmit, by the computing system of the front-end service provider, data associated with the communications request and/or the one or more back-end service providers to a charging function (CHF) proxy service, the data indicating requirements of the communications request comprising at least one of a bandwidth requirement, a cost requirement, or a charging function (CHF) registration requirement;
  - receive, by the computing system of the front-end service provider and from the CHF proxy service, information associated with a back-end service provider of the one or more back-end service providers, the information comprising at least one of a first CHF associated with the back-end service provider or a second CHF associated with the CHF proxy service;
  - establish, by the computing system of the front-end service provider, a communications connection with the back-end service provider; and
  - transmit, by the front-end service provider and to the back-end service provider, the user data such that the communications request is fulfilled.

10. The computing system of claim 9, wherein the computing system further comprises a stand-alone 5G network.

11. The computing system of claim 9, further comprising a session management function, a user plane function, a policy control function and a network repository function.

12. The computing system of claim 11, wherein the policy control function includes one or more policies associated with at least one of the communications request, a sender of the communications request, and policies associated with a front-end service provider.

13. The computing system of claim 11, wherein the network repository function includes one or more charging functions, associated with the one or more back-end service providers.

14. The computing system of claim 11, wherein the network repository function includes a charging function associated with an online marketplace for back-end service providers.

15. The computing system of claim 11, wherein the session management function comprises one or more provider attributes, the one or more provider attributes comprising a service level and a service capacity.

16. The computing system of claim 11, wherein the communications request is received from a user equipment.

17. The computing system of claim 11, wherein the computing system of the front-end service provider provides authentication information associated with a user equipment (UE) to the back-end service provider after the communications connection is established.

18. The computing system of claim 11, wherein the information associated with the back-end service provider comprises a charging function.

19. The method of claim 1, wherein determining, by the computing system of the front-end service provider, that one or more back-end service providers can fulfil the communications request further comprises determining one or more back-end service providers associated with geographic locations corresponding to respective endpoints of the one or more endpoints.

* * * * *